United States Patent [19]

Bodson

[11] 3,954,937

[45] May 4, 1976

[54] PROCESS FOR THE TREATMENT OF MATERIAL CONTAINING ZINC AND SILICA FOR RECOVERING OF ZINC BY HYDROMETALLURGIC WAY

[76] Inventor: Fernand Jacques Joseph Bodson, 35, Quai Saint Paul de Sincay, B.4900 Angleur, Belgium

[22] Filed: Aug. 2, 1974

[21] Appl. No.: 494,297

[30] Foreign Application Priority Data

Aug. 2, 1973   Belgium ................................ 44268

[52] U.S. Cl. ............................... 423/101; 423/109; 423/339
[51] Int. Cl.² .......................................... C01G 9/00
[58] Field of Search .................... 423/101, 109, 339; 75/120, 108, 101 R

[56] References Cited
UNITED STATES PATENTS

| | | | |
|---|---|---|---|
| 3,652,264 | 3/1972 | Bodson | 75/101 R |
| 3,656,941 | 4/1972 | Matthew et al. | 75/120 |
| 3,684,490 | 8/1972 | Steintveit | 75/120 |

*Primary Examiner*—Oscar R. Vertiz
*Assistant Examiner*—Wayne A. Langel
*Attorney, Agent, or Firm*—Young & Thompson

[57] ABSTRACT

In a process for the treatment of a material containing zinc and soluble silica by dilute aqueous solutions of sulphuric acid at a temperature below its boiling point under atmospheric pressure, the acid is progressively added to the zinc containing material over a period of at least 3 hours, in such a quantity that the final acidity of the solution will be 1.5 to 15 g/l, while carefully maintaining the temperature at 70° to 90°C, thereby inducing the lixiviation of the material and simultaneously the reprecipitation of silica in a crystalline form which can readily be eliminated by filtration.

4 Claims, No Drawings

PROCESS FOR THE TREATMENT OF MATERIAL CONTAINING ZINC AND SILICA FOR RECOVERING OF ZINC BY HYDROMETALLURGIC WAY

The present invention relates to a process for the treatment of material containing zinc and silica (e.g. zinc silicates) in order to recover the zinc hydro-metallurgic alloy.

Materials containing zinc silicates have various origins. Oxidized zinc ores are known, in which the metal can be found in various forms such as, for example, smithsonite ($ZnCO_3$), willemite ($2ZnO.SiO_2$), calamine ($2ZnO.SiO_2.H_2O$), and mixtures of these minerals; there also exist zinc-containing siliceous slags which originate from the metallurgy of lead.

In order to extract the zinc from the silicates in which it is contained, it is known to subject them to a treatment with dilute sulphuric acid with the result that the zinc and at least a part of the silica, which is soluble in this acid, are dissolved.

However, when materials containing zinc silicates are subjected to lixiviation in a dilute solution of sulphuric acid, the zinc and the soluble part of the silica are only dissolved if the acidity of the solution is high, that is to say that pH is low, of the order of 1.5 to 2. If the acidity is less, the zinc will not be totally dissolved. In general, the soluble silica is that originating from silicates while the insoluble silica is that present in the uncombined state in particular quartz. The insoluble silica remains in this form and involves no difficulties whatever when being separated by filtration; this is not so with soluble or solubilized silica.

This silica in solution is in a state of super-saturation and always precipitates after a certain time. The rate of precipitation of this solubilized silica depends on the operating conditions. Thus, an increase of the pH or an increase of the temperature favors and accelerates precipitation; however, because of this unstable phenomenon which is difficult to control, the silica has the tendency of precipitating in the form of a gel which makes the filtration slow, difficult, or even impossible in industrial practice.

Various processes for overcoming this drawback have already been proposed. Among them a two-stage process is known: in the first stage the ore is lixiviated with an aqueous solution of sulphuric acid to a pH of 1.0 to 3.0 so as to obtain a solution containing the zinc and a part of the silica; in the second stage a neutralizing agent is added to the solution to raise the pH to a value of 4.0 to 6.0 so that all the silica will be converted into a form which can be readily separated by known means.

It is also known to treat zinc-containing materials with sulphuric acid and to stir for a long time while carefully maintaining a temperature of 20° to 50°C. and then to add magnesia or lime to neutralize the solution and to precipitate the silica in the form of filtrable granular complexes.

The known processes for the treatment of silica-containing zinc ores are not wholly satisfactory.

The present invention provides a process for the treatment of a material containing zinc and soluble silica with an aqueous solution of dilute sulphuric acid, in which the acid is added in a progressive manner and in such a quantity that at the end of the addition the acidity of the solution will be between 1.5 g/l and 15 g/l, while carefully maintaining the temperature between 70° and 90°C. throughout the time of the lixiviation.

The addition of the acid is progressive, this is to say that it must not only bring about the above-mentioned acidity but must also be spread over a sufficiently long time so that the zinc and the soluble silica will be totally dissolved and also so that the silica thus solubilized should not only have started to precipitate but be completely precipitated in the form of silica of crystalline form which can readily be separated by filtration.

It has been found that the progressive addition of the acid, alone, is not sufficient for the silicate to be precipitated in the crystalline, filtrable form but it is also necessary that in the course of lixiviation the temperature should be not less than 70°C. and not more than 90°C.; maintenance of this temperature is effected by supplying heat by any desired means.

The progressive addition and the maintenance of the temperature between 70° and 90°C. resulted in the surprisingly finding that in contrast to the prior art, it is quite unnecessary to operate in several stages or to proceed with neutralization of the lixiviating solution in order to induce reprecipitation of the solubilized silica. This is reflected in practical terms by an operating method which is more simple, less costly, and easier to put into practice than the known processes.

It has been found that the present process permits one to obtain systematically zinc solutions containing no more than small quantities of silica, which do not give rise to the formation of silica gel. The material remaining in suspension in the solution contains all the non-solubilized particles and the subsequently reprecipitated solubilized silica.

The process can be carried out simply, for example in the following way. The material to be lixiviated, finely ground, is put into suspension in water or in a neutral solution of zinc sulphate, in a container; this suspension is heated to about 90°C. and stirred, and then a dilute solution of sulphuric acid (e.g. originating from electrolytic cells) containing 100 g/l to 200 g/l of free acid is introduced little by little; the temperature is maintained between 70° and 90°C. by a supply of heat by any known means. The duration of the addition of the acid is long; it must not be less than three hours but it can easily amount to 8 or even 10 hours.

The quantity of acid added is variable; it is determined by the final acidity which is desired. At the end of the addition the solution must have an acidity of between 1.5 g and 15 g of free acid per liter.

While carefully maintaining the temperature between 70° and 90°C, stirring is still continued for a period of 2 to 4 hours after the end of the last addition of acid; this effects and completes the precipitation of all the solubilized silica.

At the end of this period, the acid solution contains, in particular, zinc in the form of a soluble sulphate and silica in suspension in a crystalline, insoluble form.

In order to be able to recover the zinc by electrolysis it is necessary to proceed with the neutralization of the acid solution.

To do this, the acid solution, having a temperature of about 50°C. and containing the insoluble materials in suspension, is progressively added to an aqueous suspension of lime or pure zinc oxide or zinc oxide contained in calcined ores. This addition, which is effected while taking care to maintain the final pH between 3 and 5, should take between 1 and 3 hours; furthermore, in the course of this addition, finely dispersed air is blown in, thus inducing the oxidation and then the precipitation of certain impurities, such as iron in the first instance. After filtration, the solution is purified by known processes so as finally to form a solution which is used for the recovery of zinc by electrolysis.

Alternatively, it is possible to proceed with the neutralization of the acid solution after having eliminated the suspended part by filtration.

Another way of operating the lixiviation is to finely crush the material to be treated and then introduce it into a vat or reactor of a series of four or more, for example six; the sulphuric acid — necessary for the operation — is distributed into the six vats and the temperature maintained between 70° and 90°C. in each of them. The material passes from one vat to the next within a time of about 3 to 5 hours; in these vats the pH is lowered progressively from the first to the last vat where it is about 1.5 and where the free acidity is between 1.5 and 15 g per liter.

The acid solution in the last vat contains, in particular, zinc in the form of a soluble sulphate and the silica in suspension in a crystalline, insoluble form. At this stage it is possible to proceed with neutralization, either prior to or after the filtration, as explained above.

EXAMPLE 1

A zinc ore containing 36.74% zinc and 30.15% $SiO_2$, analyzed by X-ray diffraction as 90% hemimorphite and 10% willemite, was treated according to two different processes.

1. The first process corresponds to a known test which is carried out in order to characterize an ore prior to its industrial treatment; this test, called the Anaconda test, permits one to evaluate, in particular, the maximum quantity of zinc which can be extracted from an ore.

300 g of the finely crushed ore were put into suspension in water. While the temperature was maintained at 60°C., sulphuric acid was added so as to maintain the free acidity at 10 g/l throughout the duration of lixiviation, which was about one hour. The solution was separated from the residue, the filtration of which was very difficult.

The solution contained 109.62 g/l of Zn and 40.79 g/l of $SiO_2$.

After washing, 119.03 g of this residue containing 0.5% of Zn and 41.72% of $SiO_2$ were obtained.

The yields of the dissolution were thus Zn 99.46% and $SiO_2$ 45.10%. This shows that the silica was precipitated in a ratio of 54.9%.

2. The second process was carried out in accordance with the invention, 750 g of finely crushed ore were put into suspension in one liter of zinc sulphate solution, the temperature was maintained at 90°C. by heating; 2.990 liters of a solution of sulphuric acid (151 g/l) were added thereto, apportioned over 7 hours; the final acidity is 13 g/l; the silica content was 0.762 g/l. Stirring was continued for 4 additional hours while the temperature of 90°C. was maintained; the acidity remained constant at 13 g/l and silica content was reduced to 0.247 g/l. The suspension was decanted. A clear solution was separated from a concentrated pulp whose silica content was 300 g/l. This pulp was vacuum filtered.

The filtration rate was measured and amounted to 250 kg/hm² of dry solids with a thickness of the cake of 17 mm and a vacuum of 450 mm of mercury, and 600 kg/hm² with a thickness of 27 mm and an identical vacuum.

The residue obtained, which weight 375.61 g, contained: Zn total, 3.28%, Zn soluble in $H_2O$. 2.62%; $SiO_2$, 60.10%.

"Zn soluble in $H_2O$" represents the quantity of lixiviated Zn which has not been eliminated from the residue, because of the lack of washing, and which takes the form of a sulphate.

In this case, the overall yield of the lixiviation of Zn was 95.53% and the yield of the precipitation of silica was 99.67%; it is thus apparent that the silica was almost totally eliminated by precipitation.

EXAMPLE 2

A zinc ore containing 42.42% Zn and 21.63% $SiO_2$, analyzed by X-ray diffraction as willemite with traces of quartz, hematite, and ferrite, was treated by two different processes.

1. 300 g of finely crushed ore were treated as in process (1) of Example 1.

After lixiviation the solution obtained contained 121.47 g/l of Zn and 53.4 g/l of $SiO_2$.

After washing 74.87 g of residue were obtained containing 7.7% of Zn and 16.20% of $SiO_2$.

The yields of the dissolution were thus 96.47% Zn and 81.50% $SiO_2$ the silica was thus precipitated in a ratio of 18.5%.

2. In accordance with the invention, 750 g of finely crushed ore were put into suspension in 1 liter of zinc sulphate solution; the temperature was maintained at 90°C. 3.150 liters of sulphuric acid solution (169 g/l) were added thereto, apportioned over 7 hours; the final acidity was 13 g/l and the silica content 0.672 g/l; stirring and temperature maintenance were continued for 4 additional hours; the acidity remained constant at 13 g/l and the silica content was reduced to 0.147 g/l.

The suspension was decanted and a clear solution separated from a concentrated pulp whose silica content was 380 g/l.

This pulp was vacuum filtered and washed. The filtration rate was measured and amounted to 144 kg/hm² of dry solids with a thickness of the cake of 48 mm and a vacuum of 450 mm of mercury.

The residue, which weighed 367.8 g, contained: Zn total, 3.46%; Zn soluble in $H_2O$, 2.36%; $SiO_2$, 44.39%. This corresponds to an overall yield of the lixiviation of Zn of 96% and a yield of the precipitation of silica of 99.62%; it is thus apparent that the silica was almost totally eliminated.

EXAMPLE 3

A zinc ore containing 47.06% Zn and 24.60% $SiO_2$, combined as willemite (75%) and smithsonite (25%), was lixiviated by three processes.

1. 300 g of finely crushed ore treated as in process 1) of Example 1. After lixiviation the solution obtained contained 139.41 g/l of Zn and 65.7 g/l of $SiO_2$; after washing, 31.19 g of residue were obtained, containing 5.9% of Zn and 12.31 of $SiO_2$. The yields of the dissolution are thus 98.7% of Zn and 94.8% of $SiO_2$ the silicate is thus precipitated at a low rate.

2. In accordance with the invention, 750 g of finely crushed ore was put into suspension in 1 liter of zinc sulphate solution, the temperature being maintained at 90°C. 2.720 liters of sulphuric acid solution (250 g/l) were added thereto, apportioned over 7 hours; the final acidity was 6 g/l and the silica content 0.687 g/l. Stirring was continued for 4 additional hours. The acidity fell to 4 g/l and the silica content to 0.291 g/l. The solution was decanted and a clear solution separated from a concentrated pulp whose solids content was 160 g/l. This pulp was vacuum filtered and washed. The speed of filtration was measured and amounted to 125 kg/hm$^2$ of dry solids with a thickness of the cake of 25 mm and a vacuum of 450 mm of mercury. A residue weighing 385.31g was obtained containing: Zn total, 5.65%; Zn soluble in $H_2O$, 0.16%; $SiO_2$, 47.6%. This corresponds to an overall yield of the lixiviation of zinc of 94.4% and a yield of the precipitation of the silica of 94.41%; a very large portion of the silica is thus eliminated by precipitation.

3. In accordance with the invention, 750 g of finely crushed ore were put into suspension in one liter of zinc sulphate solution, the temperature being maintained at 90°C. 3.700 liters of acid solution (158 g/l of sulphuric acid) were added thereto, apportioned over 7 hours, the final acidity was 7 g/l and the silica content 0.240 g/l.

A suspension of lime Ca (OH)$_2$ in the ratio of 30 g of lime to 60 g of water was prepared.

This milk of lime was poured into a vat containing 1.2. liter of vigorously stirred zinc sulphate solution. A portion of the zinc was thus precipitated. This zinc precipitate is particularly reactive. The suspension thus formed was brought to 80°C. and finely dispersed air was injected at the rate of 800 l/h per m$^3$ of the volume of the reactants. At a constant rate and during a period of 2 hours, the acid suspension originating from the lixiviation of the zinc silicate ore was added thereto. A clear solution was separated from a concentrated pulp whose solids content was 215 g/l. The solution contained less than 1 mg/l of iron in solution and less than 0.100 g/l of $SiO_2$.

The pulp was vacuum filtered and washed. The speed of filtration was measured and amounted to 654 kg/hm$^2$ of solids with a thickness of the cake of 25 mm and a vacuum of 450 mm Hg. The residue weighing 612 g contained Zn total, 3.55%; Zn soluble in $H_2O$, 0.73%; $SiO_2$, 44.69%. This corresponds to an overall yield of the lixiviation of the zinc of 96.7% and a yield of the precipitation of the silica of 99.8%; the silica was thus almost totally precipitated.

EXAMPLE 4

Slags originating from a lead furnace were granulated in a jet of water; they were then crushed in 75 manner such that all the grains were smaller than mm.

The composition of the slags was as follows: Zn 16.61% Fe 22.6%; Pb 3.15%; Cu 0.22%; $SiO_2$ 22.3%. By X-ray diffraction no definite molecular compound whatever was detected. The material was thus in the vitreous state. These slags were lixiviated by two different processes as follows:

1. In accordance with a known process, 600 g of slag were put into suspension in water; the temperature was maintained at 60°C., the pH being maintained constant at a value of 2. The duration of lixiviation was 2 hours. The solution was separated from the very difficultly filtrable residue. The solution contained 72 g/l of Zn and 7.1 g/l of $SiO_2$. The residue, which weighed 263.93 g, contained 6.57% of Zn and 11.05% of $SiO_2$. The yields of the dissolution were 82.6% of Zn and 78.2% of $SiO_2$ respectively; the quantity of precipitated silica was thus only 21.8%.

2. In accordance with the invention, 2000 g of slag were put into suspension in water. The temperature was maintained at 75°C. The pH was progressively lowered by means of an aqueous solution (158 g/l) of sulphuric acid: it was maintained at pH 5 for ½ hour, at pH 4 for ½ hour, at pH 3 for ½ hour, at pH 2 for 2 hours, and at pH 1.7 for 3 hours; i.e. a total duration of 5 h 30 min. The Zn content of the solution was 99.2 g/l and the $SiO_2$ content 0.08 g/l. The solution was decanted. A clear solution was separated from a concentrated pulp whose solids content was 557 g/l. This pulp was vacuum filtered and washed. The filtration rate was measured and amounted to 745 kg/hm$^2$ of dry solids with a thickness of the cake of 35 mm and a vacuum of 450 mm of mercury.

The residue, which weighed 919.77g, contained: Zn total, 3.54%; Zn soluble in $H_2O$, 0.71%, $SiO_2$, 48.25%. This corresponds to an overall yield of the lixiviation of the zinc of 90.2% and a yield of the precipitation of the silica of 99.5%; the silica was thus almost totally eliminated by precipitation.

Examination of the above examples makes it apparent that when the ore is treated according to the known process, a variable and considerable portion of silica remains in solution and a quantity of silica therefore precipitates which is variable from case to case; in addition, the filtration is very slow and cannot be carried out in industry.

When the ore is treated by a process in accordance with the invention, the silica is almost totally precipitated in a crystalline form which can easily and quickly be separated by filtration. In addition, these examples show that the process of the invention is applied with the same ease and to the same advantage, whatever may be the crystalline forms of the zinc compounds in the starting material.

What we claim is:

1. A process for the treatment of a material selected from the group consisting of siliceous zinc ore and zinc containing siliceous slag, comprising finely grinding said material, forming an aqueous suspension of said finely ground material, heating said suspension to a temperature between 70° and 90°C., progressively adding to said heated suspension a solution of sulfuric acid containing 100 g/l to 200 g/l of free $H_2SO_4$ over a period of 3 to 10 hours in such a quantity that at the end of addition said suspension contains 1.5 to 15 g/l of free $H_2SO_4$, and stirring said suspension for 2 to 4 hours after the end of the acid addition while keeping the temperature between 70° and 90°C, thereby inducing simultaneously the lixiviation of the material and the reprecipitation of silica in a crystalline form, and separating said crystalline silica from said suspension.

2. A process as claimed in claim 1, in which said suspension is introduced successively into each of a plurality of reactors in each of which the acid necessary for the reaction is progressively added.

3. A process as claimed in claim 1, in which said material is siliceous zinc ore.

4. A process as claimed in claim 1, in which said material is zinc containing siliceous slag which originates from a lead furnace.

* * * * *